Sept. 30, 1941.  W. W. LININGER  2,257,612
SUN VISOR EXTENSION
Filed Dec. 15, 1938  2 Sheets-Sheet 1
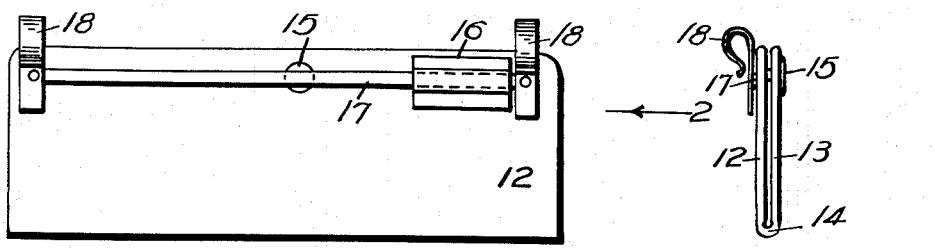
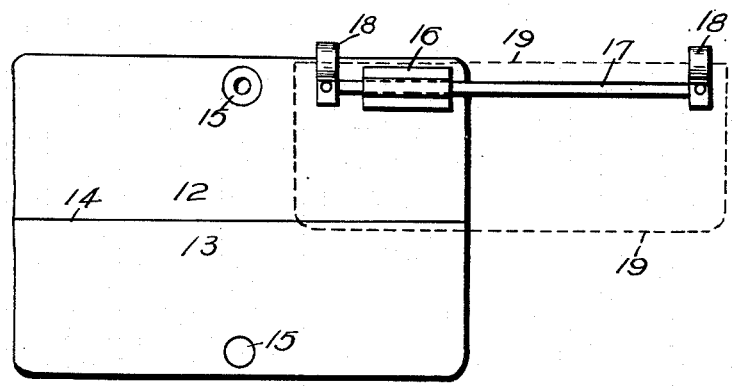
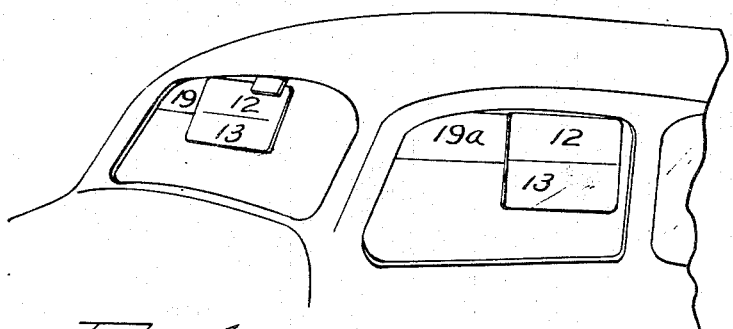
INVENTOR.
WILLIAM W. LININGER
BY Rollandet, McGrew & Campbell
ATTORNEYS.

Sept. 30, 1941.   W. W. LININGER   2,257,612
SUN VISOR EXTENSION
Filed Dec. 15, 1938    2 Sheets-Sheet 2
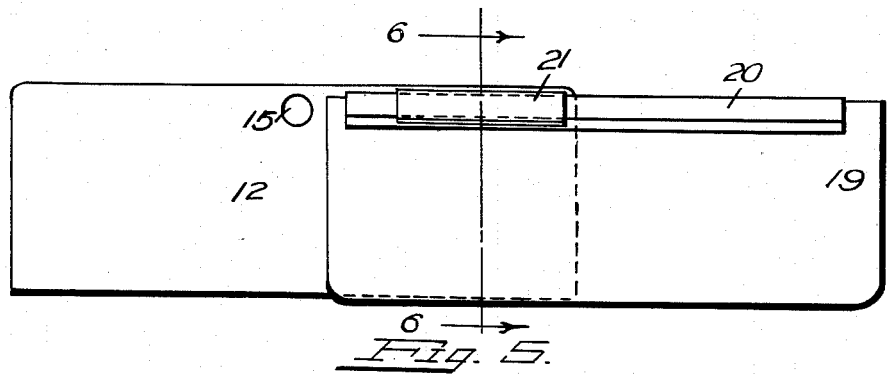
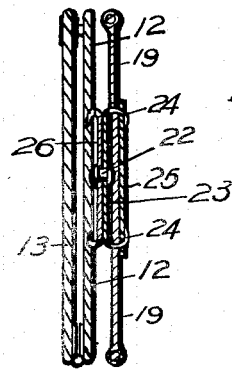
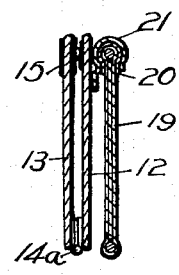
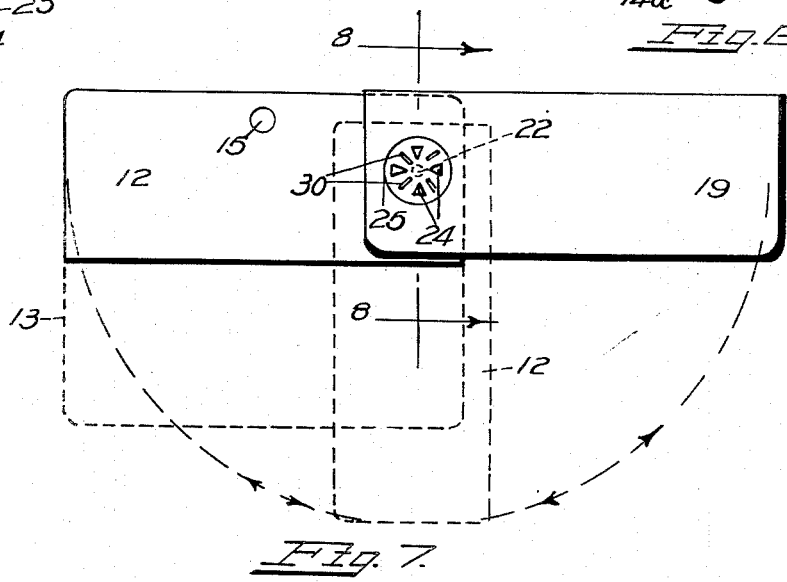
INVENTOR.
WILLIAM W. LININGER
BY Rollandet, McGrew & Campbell
ATTORNEYS.

Patented Sept. 30, 1941

2,257,612

UNITED STATES PATENT OFFICE 2,257,612

SUN VISOR EXTENSION

William W. Lininger, Denver, Colo.

Application December 15, 1938, Serial No. 245,857

1 Claim. (Cl. 296—97)

This invention relates to improvements in sun visor extensions for automobiles.

As is well-known to motorists, the ordinary sun visors with which many automobiles are equipped, do not cover sufficient area to completely shut out sun glare and heat at all times. For instance, when the sun's rays are coming in from the side of a car and the ordinary sun visor is turned to the side position, there is usually an unprotected space to the rear and below the ordinary visor where discomforting sun rays may enter. When the sun's glare and heat are coming from the front and the sun is low toward the horizon, the glare and heat may enter the car through the glass of the front windshield below the ordinary sun visor. At night the glare of headlights from the rear may produce an annoying glare reflection in the rear view mirror which ordinarily cannot be covered up by common visors.

It is an object, therefore, of the present invention to provide an extension for ordinary automobile sun visors, which can be readily and quickly attached to such a visor and which may be extended longitudinally of the visor in any of its ordinary working positions, and which may also be unfolded downwardly to extend the vertical area from which glare may be excluded.

Other objects and advantages reside in details of design and construction which will be more fully disclosed in the following description and in the drawings wherein like parts have been similarly designated and in which:

Figure 1 is an elevation of a sun visor extension that is made according to this invention;

Figure 2 is an end elevation looking in the direction of arrow 2;

Figure 3 is an elevation of a sun visor similar to that shown in Figures 1 and 2, in its extended position;

Figure 4 is a fragmentary view of an automobile, showing operating positions of the improved sun visor in its extended positions;

Figure 5 illustrates a modified embodiment of the invention;

Figure 6 is a sectional view taken along the line 6—6 of Figure 5;

Figure 7 illustrates a further modified embodiment of the invention; and

Figure 8 is a cross section along the line 8—8 of Figure 7 and drawn to a larger scale.

In the drawings, reference character 12 denotes the front panel of the sun visor extension, and reference character 13 denotes the rear panel that is similar to the front and is hinged thereto at 14, the hinge preferably being effected by the cloth covering material with which the devices are finished. Each panel is preferably composed of a stiffening board such as cardboard or the like, over which the cloth or fabric finishing material is stretched and sewed. Also it may be made of panel board or any material to resist glare and heat not using cloth, in its construction.

Means for selectively fastening the front panel and the back panel in their folded-together position as shown in Figures 1 and 2, is provided, such as a snap fastening indicated by reference character 15.

On the front face of the front panel is secured a guide 16 through which a bar 17 is slidable. The bar 17 carries adjacent each of its ends, a spring clip 18.

Referring particularly to Figure 3, reference character 19 denotes a common automobile sun visor and in order to mount the improved extension onto the visor, the spring clips 18 are slipped over the upper edge of the visor, thereby mounting the extension on the side of the visor that is away from the occupants of the car when the visor is in its position across the front of the car. When it is desired to extend the area from which glare and heat are excluded, the entire extension assembly may be slid longitudinally along the bar 17 by means of the slide 16 and the complementary panels 12 and 13 may be unfolded, both of these extension features being clearly shown in Figure 3, which is an assembly as it would be used on the right-hand side of the car.

Figure 4 illustrates the extended position of the visor as shown in Figure 3, as it would appear across the front windshield glass of an automobile. By this arrangement, the extension may be drawn inwardly of the car from the right-hand side to cover as much area as the occupants of the car may desire. In this position, the extension is also effective for covering the rear view mirror in case an unwanted glare is reflected therefrom.

The front side window of the automobile illustrated in Figure 4, may be protected from side glare and heat by swinging the left-hand visor 19a to its side position and drawing the improved extension rearwardly along the visor 19a and unfolding it downwardly as clearly illustrated.

Referring to Figures 5 and 6, a modified form of the improved sun visor extension is illustrated, which is composed of similar front and rear panels 12 and 13 respectively, which are, in this form, attached by small hinges 14a. In effecting the installation of this form of the visor extension, a metallic guide 20 preferably made of spring metal and having the particular undercut cross sectional shape as illustrated, is first placed along the upper edge of the visor 19. The front panel 12 of the extension is provided with a spring slide 21 that corresponds in cross sectional shape with the cross section of the guide 20. This provides for longitudinal movement of the improved extension and it may be unfolded downwardly on its hinges 14a as hereinabove set forth. The particular shape of the guide 20 and its associated slide 21, keeps the extension in alinement with the visor in all of its normal extended positions.

Figures 7 and 8 illustrate a further modified embodiment of this inventive concept, wherein the front panel 12 of the extension is pivotally attached to the visor 19 as shown at 22. When the extension is not in use, it is folded back of the visor 19 where it is substantially out of sight When the extension is used, it may be rotated about its pivotal connection 22 to its extended position as illustrated in Figure 7, and it may also be unfolded downwardly since its component parts are similar to the improved extensions hereinabove described.

A preferred method of effecting the pivotal connection between the front panel 12 of the extension and the visor 19, is to provide a spring metal disk 23 which is provided with sharp tongues 24, which are passed through the visor 19 and inserted through a metallic plate 25 on the opposite side of the visor. The plate 25 is provided with apertures corresponding to the size and position of the tongues 24. After the tongues 24 have been inserted through the plate 25, they may be bent to retain the assembly.

Another similar spring metal disk 26 is attached to the front panel 12 of the extension and the two disks 23 and 26 are connected for relative angular movement by means of the rivet 22. One of the spring disks is provided with radial grooves or notches 30 and the other is provided with correspondingly located ridges so that as the ridges come in register with the grooves, the two spring disks are retained in that particular position and are thus secured against accidental movement. When the operator desires to change the relative position of the extension and the visor, the visor may be manually moved to any desired position where the ridges and depressions will register. Some of the preferred relative angular positions of the visor and the extension are illustrated in Figure 7 and they are 90° and 180°. The extensions are made in right and left hand to coordinate with the corresponding visors, in all forms.

It will thus be seen that the stated objects of the invention are adequately effected, and while this specification discloses preferred means for reducing the present invention to practice and a preferred embodiment of the invention, changes may occur to those skilled in the art and may be made within the scope of the appended claim, without departing from the spirit of the invention.

What I claim and desire to secure by Letters Patent is:

As an article of manufacture, a visor extension comprising an extension element having hinged complementary members, and mechanism inclusive of spring clips, a guide and a slide member, for mounting said element on a visor for limited sliding extension movement relative thereto.

WILLIAM W. LININGER.